(12) United States Patent
Padmanabhan et al.

(10) Patent No.: US 6,558,766 B2
(45) Date of Patent: *May 6, 2003

(54) COMPOSITE WOOD FLOORING

(75) Inventors: Gopalkrishna Padmanabhan, St. Louis, MO (US); Lokeswarappa R. Dharani, Rolla, MO (US); James N. Vangilder, Jackson, MO (US)

(73) Assignee: Havco Wood Products L.L.C., Scott City, MO (US)

( * ) Notice: Subject to any disclaimer, the term of this patent is extended or adjusted under 35 U.S.C. 154(b) by 10 days.

This patent is subject to a terminal disclaimer.

(21) Appl. No.: 09/732,416

(22) Filed: Dec. 7, 2000

(65) Prior Publication Data

US 2001/0003623 A1 Jun. 14, 2001

Related U.S. Application Data

(63) Continuation of application No. 09/294,476, filed on Apr. 20, 1999, now Pat. No. 6,183,824, which is a continuation-in-part of application No. 08/484,364, filed on Jun. 7, 1995, now Pat. No. 5,928,735.

(51) Int. Cl.[7] .............................. B32B 3/00; B32B 21/08
(52) U.S. Cl. .............................. 428/54; 428/55; 428/58; 428/77; 428/297.4; 428/298.1; 428/299.1; 428/299.4; 428/511; 428/537.1; 442/413
(58) Field of Search .............................. 428/537.1, 485, 428/532, 413, 507, 511, 528, 225, 228, 227, 232, 298.1, 299.1, 299.4, 33, 55, 58, 77, 297.4, 297, 54; 442/413

(56) References Cited

U.S. PATENT DOCUMENTS

| 2,537,343 A | 1/1951 | Golick et al. ............. 428/478.4 |
| 2,588,580 A | 3/1952 | Scruggs ....................... 156/291 |
| 3,037,900 A | 6/1962 | Hings et al. ................. 156/310 |
| 3,315,380 A | 4/1967 | Mack, III et al. ............. 36/19.5 |
| 3,563,403 A * | 2/1971 | Luisada ....................... 220/1.5 |
| 3,681,883 A | 8/1972 | Ehrlich ........................ 52/220 |

(List continued on next page.)

FOREIGN PATENT DOCUMENTS

JP          06280375        10/1994

OTHER PUBLICATIONS

"Prestressed FRP Sheets As External Reinforcement of Wood Members" by Thanasis C. Triantafillou and Nikola Deskovic; *Journal of Structural Engineering*, vol. 118. No. 5, May 1992, pp. 1270–1284.

"A Feasibility Study For Strengthening Timber Beams With Fibreglass" By F.H. Theakston; *Canadian Agricultural Engineering*, Jan. 1965, pp.17–19.

*Primary Examiner*—Paul Thibodeau
*Assistant Examiner*—Monique R. Jackson
(74) *Attorney, Agent, or Firm*—Ohlandt, Greeley, Ruggiero & Perle L.L.P.

(57) ABSTRACT

A fiber reinforced composite wood flooring is designed particularly for use in van-type truck trailers which experience adverse operating conditions due to heavy lift truck traffic on the top side and water spray during rainy periods on the bottom side. The composite wood flooring comprises edge-glued laminated wood which is underlaid with a thin layer of fiber reinforced plastic. The top surface of the composite wood floor is the same as that of a conventional laminated wood floor. The fiber reinforced plastic underlay is composed of glass and/or carbon fibers embedded in a polymeric resin such as epoxy, phenolic, vinyl ester, polypropylene or polyamide resin. The fiber reinforcement is designed to enhance the mechanical properties of the flooring in the longitudinal and transverse directions of the floor. The fiber reinforced plastic improves the fatigue resistance of the composite wood flooring and prevents water leakage into the trailer through the floor boards.

21 Claims, 5 Drawing Sheets

U.S. PATENT DOCUMENTS

| | | | |
|---|---|---|---|
| 3,751,864 A | 8/1973 | Berger et al. .................. 52/79 |
| 3,848,284 A | 11/1974 | Livingston ........................ 9/6 |
| 4,083,743 A | 4/1978 | Degens ...................... 156/278 |
| 4,158,712 A | 6/1979 | Degens ...................... 428/212 |
| 4,158,713 A | 6/1979 | Degens ...................... 428/212 |
| 4,180,413 A | 12/1979 | Diederich ................... 156/185 |
| 4,188,445 A | 2/1980 | Hill ........................... 428/246 |
| 4,288,957 A | 9/1981 | Meehan ........................ 52/460 |
| 4,307,883 A | 12/1981 | Kelly ............................ 273/51 |
| 4,378,402 A | 3/1983 | Below ........................ 428/247 |
| 4,443,520 A | 4/1984 | Braithwaite ................ 428/438 |
| 4,489,121 A | 12/1984 | Luckanuck ................. 428/192 |
| 4,500,387 A | 2/1985 | Embury ...................... 156/499 |
| 4,520,057 A * | 5/1985 | Fujii et al. .................... 428/68 |
| 4,526,418 A | 7/1985 | Martin ........................ 296/182 |
| 4,528,231 A | 7/1985 | Lund ........................... 428/148 |
| 4,620,892 A | 11/1986 | Dodson et al. ............. 156/319 |
| 4,674,745 A | 6/1987 | Speranza ...................... 273/51 |
| 4,706,424 A | 11/1987 | Garapick et al. ............. 52/181 |
| 4,735,851 A | 4/1988 | Dodson et al. ............. 428/326 |
| 4,801,483 A | 1/1989 | Beckerman et al. .......... 428/71 |
| 4,904,328 A | 2/1990 | Beecher et al. ........... 156/272.2 |
| 4,913,485 A | 4/1990 | Moffatt et al. ............. 296/190 |
| 4,938,265 A | 7/1990 | Mountz ...................... 144/347 |
| 5,041,322 A * | 8/1991 | Fouquet ...................... 428/106 |
| 5,054,843 A | 10/1991 | Gray .......................... 296/191 |
| 5,055,156 A | 10/1991 | Marino et al. .............. 156/499 |
| 5,059,472 A | 10/1991 | Le Bell et al. ............. 428/161 |
| 5,106,446 A | 4/1992 | Beck et al. ............... 156/331.7 |
| 5,135,598 A | 8/1992 | Kobe et al. ............... 156/273.3 |
| 5,135,793 A | 8/1992 | Socha ......................... 428/74 |
| 5,143,418 A | 9/1992 | Fouquet ..................... 296/182 |
| 5,153,058 A | 10/1992 | Hall et al. ................ 428/319.7 |
| 5,166,302 A | 11/1992 | Werner et al. ................ 528/67 |
| 5,190,607 A | 3/1993 | Werner et al. ........... 156/331.1 |
| 5,362,545 A | 11/1994 | Tingley ...................... 428/96 |
| 5,407,517 A | 4/1995 | Hansel et al. ............ 156/331.7 |
| 5,498,460 A | 3/1996 | Tingley ...................... 428/96 |
| 5,501,054 A | 3/1996 | Soltis et al. ............... 52/730.7 |
| 5,509,715 A | 4/1996 | Scharpf ...................... 296/181 |
| 5,599,895 A | 2/1997 | Heider ........................ 528/59 |
| 5,603,798 A | 2/1997 | Bhat ....................... 156/331.4 |
| 5,710,215 A | 1/1998 | Abend ........................ 525/124 |
| 5,730,485 A * | 3/1998 | Sjostedt et al. ............. 296/182 |
| 5,776,406 A | 7/1998 | Schubert et al. ......... 264/328.1 |
| 5,827,393 A | 10/1998 | Kinzelmann et al. .... 156/308.2 |
| 5,866,656 A | 2/1999 | Hung et al. ................. 525/123 |
| 5,928,735 A * | 7/1999 | Padmanabhan et al. ....... 428/33 |
| 6,037,049 A * | 3/2000 | Tingley ................... 428/299.1 |
| 6,179,942 B1 * | 1/2001 | Padmanabhan ............. 156/153 |

* cited by examiner

COMPOSITE WOOD FLOORING

RELATED APPLICATION

This application is a continuation of application Ser. No. 09/294,476, U.S. Pat. No. 6,183,824 filed Apr. 20, 1999, which is a continuation-in-part of application Ser. No. 08/484,364 U.S. Pat. No. 5,928,735 filed Jun. 7, 1995.

BACKGROUND OF THE INVENTION

This invention relates to an improved laminated wood flooring for van-type truck trailers. Fiber reinforced polymeric composite materials are used in conjunction with edge-glued laminated wood flooring to provide improved mechanical properties, moisture protection, fatigue resistance and light weight.

Conventional wood flooring for over-the-road truck trailers is normally manufactured with hardwoods such as oak, maple, birch, beech, etc. The green lumber used as a starting material in such manufacture is suitably dried in special drying chambers under controlled conditions. The dried lumber is then sawed into strips of rectangular cross-section and defective portions are eliminated by cross cutting the strips. During the cross-cutting process, "hooks" are formed at the ends of the lumber strips. The relatively defect-free lumber strips are smeared on their vertical sides or edges with an adhesive such as urea-melamine formaldehyde or polyvinyl acetate. The uncured edge-glued lumber strips are then assembled on a conveyor by placing them side to side and behind other strips which were previously assembled. The adhesive is cured by applying heat and edge pressure to large sections of the assembled lumber strips thus forming a unitary panel. During the assembly of the lumber strips, "hook joints" are formed at each end of every strip. These joints are simple mechanical couplings with no significant adhesive bonding. Often times, due to imperfect assembly, a readily visible gap is formed at the hook joints which can be seen from the top and bottom surfaces of the completed laminated wood floor.

The cured laminated wood is cut to a desired length (up to about 60 feet) and width (about 6 to 18 inches) to form boards. The boards are then planed to a desired thickness and shiplaps and crusher beads are machined on its sides. A shiplap is a rectangular projecting lip running along the length on each side of a floor board. The crusher bead is a small semi-circular projection running along the length on each side of a board and placed over or below a lip. When the floor boards are assembled in a trailer such that the side edges of corresponding boards are squeezed together, the shiplaps of adjacent boards overlap to form a seam. The crusher beads provide spacing between adjacent boards and help in preventing buckling of the boards due to expansion on wetting. A wood putty is applied at the hook joints on the top and bottom surfaces of the boards to fill any resident gaps. Finally, the underside of the floor boards are coated with a polymeric substance termed as "undercoating" to provide moisture protection. The finished floor boards are assembled into a kit of about eight boards for installation in trailers. Normally, a kit consists of two boards with special shiplaps so that they will fit along the road and curb sides of a trailer. The other boards may be identical in design and they are placed between the road and curb side boards. All the boards are supported by thin-walled cross-members of I, C or hat sections, each having an upper flange, which span the width of the trailer and are regularly spaced along the length of the trailer. Each floor board is secured to the cross-members by screws extending through the thicknesses of the board and the upper flanges of the cross-members.

Hardwood-based laminated wood flooring is popularly used in truck trailers since it offers many advantages. The surface characteristics of hardwoods such as high wear resistance and slip resistance are most desirable. The strength and stiffness of the flooring is important for efficient and safe transfer of the applied loads to the cross-members of the trailer. The shock resistance of wood is useful to withstand any sudden dropping of heavy cargo on the floor. Nail holding capability and ability to absorb small amounts of water, oil or grease without significantly affecting slip resistance are yet additional favorable properties of hardwood flooring.

Although the conventional hardwood flooring has many desirable features, it also suffers from certain disadvantages. For example, water from the roads is known to leak into trailers through the gaps of the hook joints that exist in the flooring. The reasons for the water leaks are believed to be the capillary action of the gaps and the tendency of the end grain of wood to absorb and store water. Although the undercoating is supposed to provide a barrier to the path of water, it may not properly cover larger gaps thus exposing them to moisture. Wetting and drying cycles can degrade the undercoating leading to its cracking and peeling away from the wood. Bending of the floor between two adjacent cross-members due to any applied load on the top of the floor also has a tendency to open the hook joints and enlarge the gaps.

A lift truck is often used on the trailer floor to load and unload cargo. The dynamic action of a moving lift truck placing heavy cargo on the trailer floor creates severe stress concentration in the flooring and some of the cross-members. A very large proportion of the weight of the lift truck and that of the cargo is transferred to the flooring through the wheels of the front axle of the lift truck due to the momentary raising of the rear axle when the lift truck is dynamically placing a heavy cargo on the floor. The effect of repeated lift truck operation on the conventional wood floor causes considerable fatigue damage including: delamination of the edge glue lines near the hook joints leading to the "pop-out" of the lumber strips; crack initiation and propagation in wood on the underside of the floor due to longitudinal tensile stresses; and edge glue line delamination due to shearing, transverse bending and twisting of the floor. The combination of moisture attack and fatigue damage to the wood floor shortens its life thus necessitating its replacement. In some cases, catastrophic structural failure of the trailer flooring system may occur leading to the unacceptable injury of working personnel and damage to machinery.

To alleviate the above-mentioned problems, a novel fiber reinforced composite wood flooring was designed, tested and refined to be an improvement over conventional wood flooring. This new composite wood flooring consists of conventional laminated wood with an underlay of fiber reinforced plastic (FRP). The top surface of the composite wood flooring is essentially the same as that of the conventional wood flooring. Since the FRP is impervious to the passage of water, it completely seals the bottom of the wood floor and solves the problem of leaky hook joints. The fiber reinforcement improves the mechanical properties of the flooring and therefore the thickness of the laminated wood can be reduced. Thus, a thinner and lighter composite wood flooring can be produced with equivalent strength when compared to a thicker conventional wood flooring. Since the reinforcement provides an excellent barrier to the "pop-out" of lumber strips, the fatigue resistance of the composite wood flooring can be improved over that of the conventional wood flooring.

Technologists are constantly trying to find ways to improve the mechanical properties, reduce weight and improve moisture resistance of wood flooring. Fouquet, U.S. Pat. No. 5,143,418 describes the use of composite plywood panels as flooring in truck trailers. The plywood was composed of veneers of wood with a majority of the veneers oriented with the wood grain along the longitudinal direction while the remaining veneers were oriented with the wood grain along the perpendicular direction. The top and bottom surfaces of the plywood panels were overlaid with resin impregnated cellulose sheets for providing moisture and slip resistance. Clearly, Fouquet has not considered a floor design involving the FRP to provide higher strength and moisture protection.

Another area of related art is the use of FRP to improve the mechanical properties of structural wood members, such as beams, columns and trusses. Theakston (Canadian Agricultural Engineering, January 1965, Pages 17–19) has discussed the use of glass fibers and epoxy resin to reinforce laminated timber beams and arches. Triantafillou and Deskovic (Journal of Structural Engineering, Vol. 118, No. 5, May 1992, Pages 1270–1284) have published test results on the reinforcement of structural wood beams by adhesively bonding prestressed carbon fiber based FRP panels using epoxy adhesive. Thus the concept of reinforcing structural wood members (especially beams) with FRP has been known for over two decades. Tingley, U.S. Pat. No. 5,362,545 describes the use of a resorcinol adhesive to bond certain special composite panels to glue-laminated wood beams (Glulams). The special composite panels containing an aramid (Kevlar®) fiber reinforcement are abraded by sanding prior to bonding. The sanding process makes the panel "hair up" due to Kevlar and helps to obtain improved bonding with wood. The Tingley patent teaches the utility of Kevlar in FRP panels to improve the bond strength of the FRP to wood while using a resorcinol adhesive.

The above-referenced patents and publications have not addressed the construction and related benefits of reinforced laminated wood flooring for use in truck trailers. The advantages of reinforcing the bottom side and disadvantages of reinforcing the top side of the laminated wood boards are not disclosed in these references. The publications do not discuss the remedies for the problems associated with the conventional wood flooring such as water leakage through the hook joints and fatigue damage due to lift truck traffic on the floor. There is no discussion in the publications regarding the type of reinforcements and resins that are suited for the fabrication of reinforced composite wood flooring. For example, the question of whether fiber reinforcement along the width (transverse) direction of the floor is advantageous is not addressed in these publications. A reinforced composite wood flooring construction such as that provided by the present invention which is suitable for lift truck movement and also for carrying cargo in a trailer has never before been invented. Methods of manufacturing the reinforced composite wood flooring of the invention have never been considered.

SUMMARY OF THE INVENTION

Unlike the FRP-wood structural beams, the reinforced composite wood flooring of the present invention is designed to provide several desirable features. The top side of the floor is simply composed of planed laminated wood as in the conventional wood flooring of trailer and truck beds. This provides a high coefficient of friction and slip resistance, thereby facilitating the safe movement of man and machine. The surface of wood can also absorb small amounts of water that may spill over it. Any oil or grease that spills on the wood surface can be wiped off and the left over slick is absorbed by the pores of wood as in a conventional wood flooring. On the contrary, even an extremely thin coating of oil on FRP can render it dangerously slippery and therefore, FRP is not laid on the top side of the composite wood floor. An FRP is laid on the bottom side of the laminated wood floor to provide protection to wood from the outside environment. The FRP underlay in the composite wood flooring eliminates the need for a polymeric undercoating and for puttying of hook joints that may be required in a conventional wood flooring. In fact, the need for hook joints themselves can be eliminated, that is, the lumber strips can be joined at butt ends thereof or by finger or lap and gap joints. However, the use of hook joints is preferred. The gaps in the hook joints are completely sealed by the FRP, thus preventing water leakage into the trailer through the flooring. Preferably, the FRP is fabricated with glass fibers and an epoxy resin. Other reinforcements such as carbon fiber and other thermosetting resins such as vinyl ester, polyester, phenolic resins and the like, and other thermoplastic resins such as polypropylene and polyamide resins and the like can also be used to fabricate the FRP. The glass fiber reinforcement provides an economical means of increasing the strength of the flooring in the longitudinal and transverse directions. The epoxy resin binds the glass fibers together and protects the fibers from adverse environment. The glass fibers resist the pop-out of the lumber strips during fatigue tests under simulated lift truck loading of a composite wood floor installed in a trailer. The transverse reinforcement resists the splitting of the FRP and delamination of edge-glue lines in laminated wood due to shearing, twisting and transverse bending loads on the floor. Thus, our design of the composite wood floor provides improvements in the prevention of moisture leakage through hook joints, maintains the desirable surface characteristics of the wood on the top surface and also provides improvements in fatigue resistance at lower weight.

The manufacture of the composite wood flooring can be accomplished by means of a suitable process wherein the fiber reinforced plastic is bonded to the surface of laminated wood. The fiber reinforcement is saturated with the resin and excess resin is squeezed out by passing the reinforcement between squeeze rollers. The resin-wetted reinforcement is placed in contact with the surface of the laminated wood and the resin is cured under heat and pressure. A batch-type or continuous hotpress can be used to apply heat and pressure on the resin-wetted reinforcement while it is still in contact with the laminated wood. A batch-type hotpress can be designed with a stationary hot platen on which the resin-wetted reinforcements are placed. Laminated wood boards are placed on top of the reinforcements. Air bladders are stationed above the hot platen to apply pressure on the top surface of the laminated wood. In a continuous hotpress, a series of hot rollers placed directly above a set of cold rollers can be used to apply heat and pressure on the composite material. The resin-wetted reinforcement is laid on laminated wood and then the combination is passed through the gap between the hot and cold rollers. At one end, the laminated wood is pushed into the roller hotpress while at the other end, the cured composite floor is pulled out of the roller hotpress.

The composite wood floor can also be manufactured by adapting the pultrusion process which normally involves the pulling of resin-wetted reinforcement through a stationary heated die where the FRP is shaped and the resin is cured. The laminated wood and the resin-wetted reinforcement can be pulled together through a heated die to produce composite wood flooring. Alternatively, a suitable prefabricated FRP sheet can be bonded to laminated wood using thermosetting or thermoplastic adhesives. The FRP sheet can be produced by pultrusion and continuous lamination processes. In the pultrusion process, the resin wetted reinforcements are pulled through a stationary heated die where the FRP is shaped and cured. In continuous lamination process, reinforcements are wetted with a polymeric resin. The wetted reinforcements are aligned in a die and then cured in an oven. Typical reinforcements used for the pultrusion process include continuous rovings, stitched, woven or knitted fabrics and continuous strand mats. In the continuous lamination process, chopped strands and chopped strand mats can be used in addition to the above-mentioned reinforcements. Preferred reinforcements for our prefabricated FRP are continuous rovings in the longitudinal direction of the FRP sheet and fabrics for transverse reinforcement. The fabrics may also be designed to provide bidirectional structural properties.

The present invention provides a novel composite wood flooring for use in truck trailers that is subjected to lift truck traffic on the top side and water spray on the bottom side. The composite wood flooring consists of conventional laminated wood to which a fiber reinforced plastic polymer is adhesively bonded on the bottom side. Since the top side is composed of wood, many desirable features of wood such as slip resistance, abrasion resistance and nailing capability are preserved. The underlayer of the composite wood flooring provides improved fatigue strength and moisture protection to wood. Since the mechanical properties of the reinforced composite wood flooring are superior to those of the conventional wood flooring, the thickness of the composite wood floor can be reduced leading to lower floor weight in a trailer. Alternatively, the load carrying capacity of the trailer can be increased with a suitable composite floor while having little or no increase in the weight of the trailer.

DETAILED DESCRIPTION OF THE PREFERRED EMBODIMENT

The reinforced composite wood flooring of the present invention is an improvement over conventional wood flooring of truck trailers in that it provides both moisture proofing and reinforcement to such flooring. In order to understand the benefits provided by the composite wood flooring, it is first necessary to understand the construction of conventional laminated wood flooring.

Figure 1:
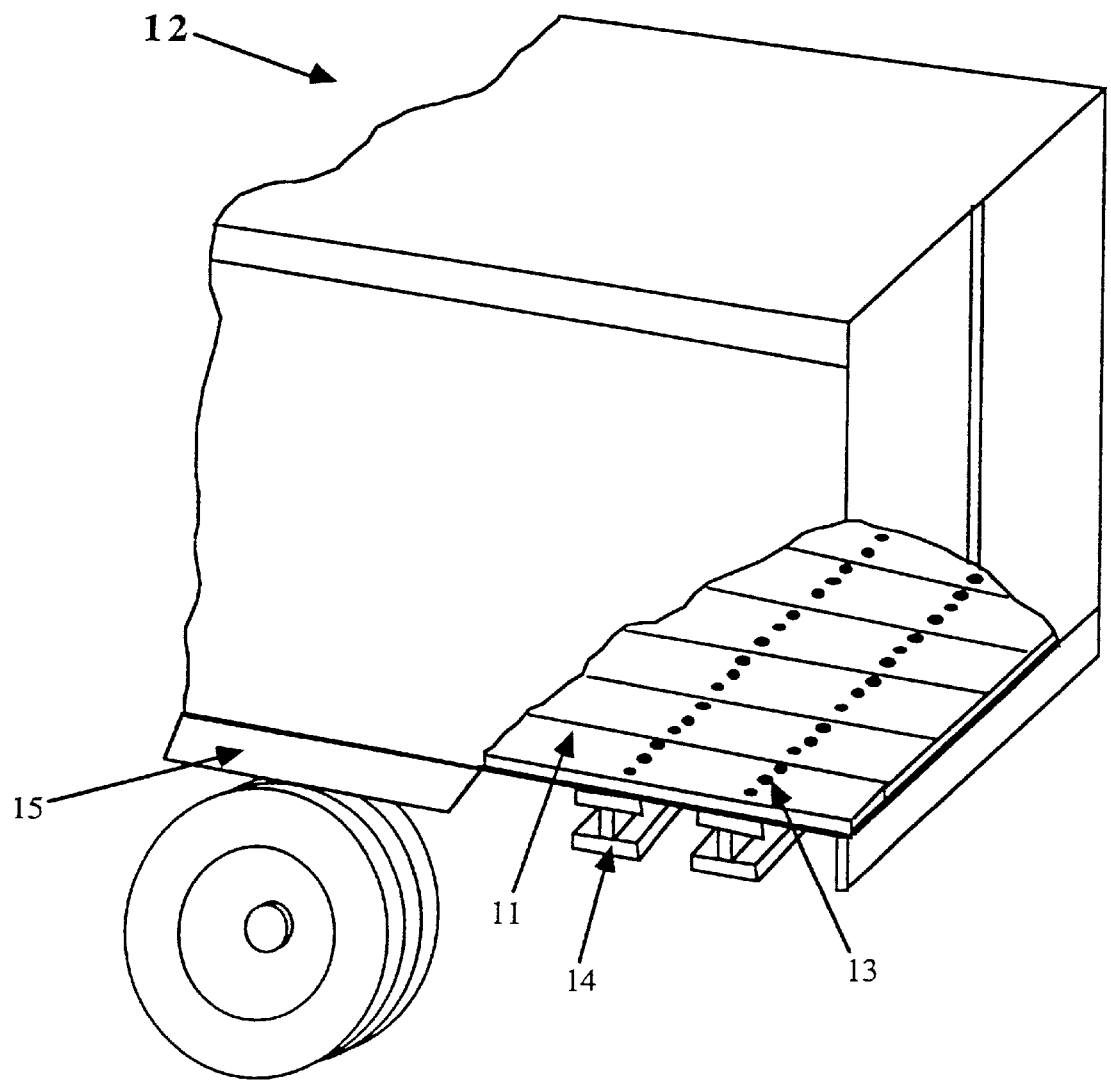
FIG. 1 is a perspective view of a van trailer showing the composite wood flooring installed on cross-members with an I-section.

Conventional wood flooring 11 for over-the-road truck trailers 12 such as that shown in FIG. 1 is normally manufactured with hardwoods such as ash, aspen, elm, yellow-poplar, and preferably oak, maple, birch, beech and the like, although softwoods such as Douglas fir and spruce could be employed. The green lumber used as a starting material in such manufacture is suitably dried in special drying chambers under controlled conditions. The dried lumber is then sawed into strips 21 of rectangular cross-section and defective portions are eliminated by cross cutting the strips. During the cross-cutting process, "hooks" 24 are formed at the ends of the lumber strips (see FIG. 4b). The relatively defect-free lumber strips are smeared on their vertical sides or edges 25 with an adhesive such as urea-melamine formaldehyde or polyvinyl acetate. The uncured edge-glued lumber strips are then assembled on a conveyor by placing them side to side and behind other strips which were previously assembled forming glue lines 22 between adjacent strips 21. The adhesive is cured by applying heat and edge pressure to large sections of the assembled lumber strips thus forming a unitary panel of laminated wood 20 such as that shown in FIG. 4a. During the assembly of the lumber strips, "hook joints" 23 are formed at each end of every strip (see FIG. 4c). These joints are simple mechanical couplings with no significant adhesive bonding. Often times, due to imperfect assembly, a readily visible gap 26 is formed at the hook joints which can be seen from the top and bottom surfaces of the completed laminated wood floor (see FIG. 4d).

Figure 2:
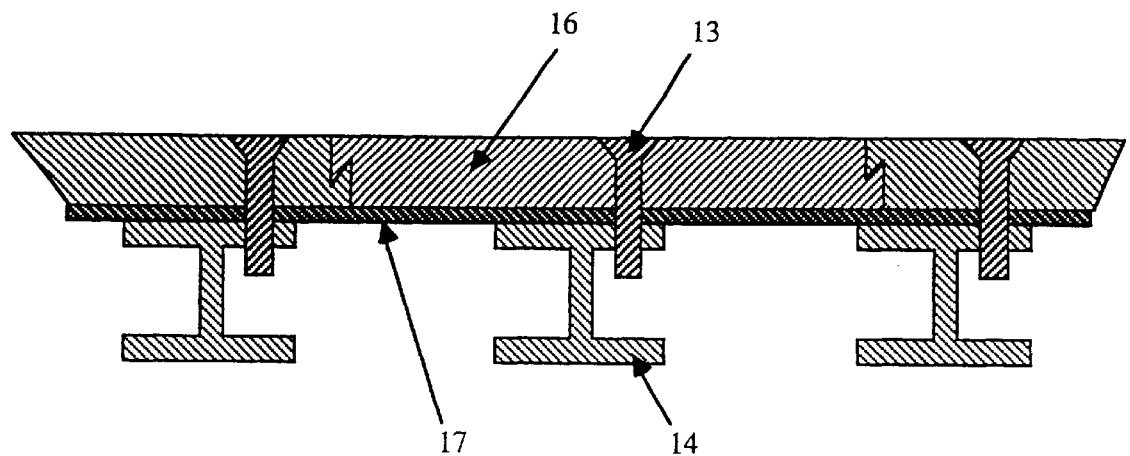
FIG. 2 is a longitudinal sectional view of a composite wood floor board fastened to cross-members of the I-section.
Figure 3:
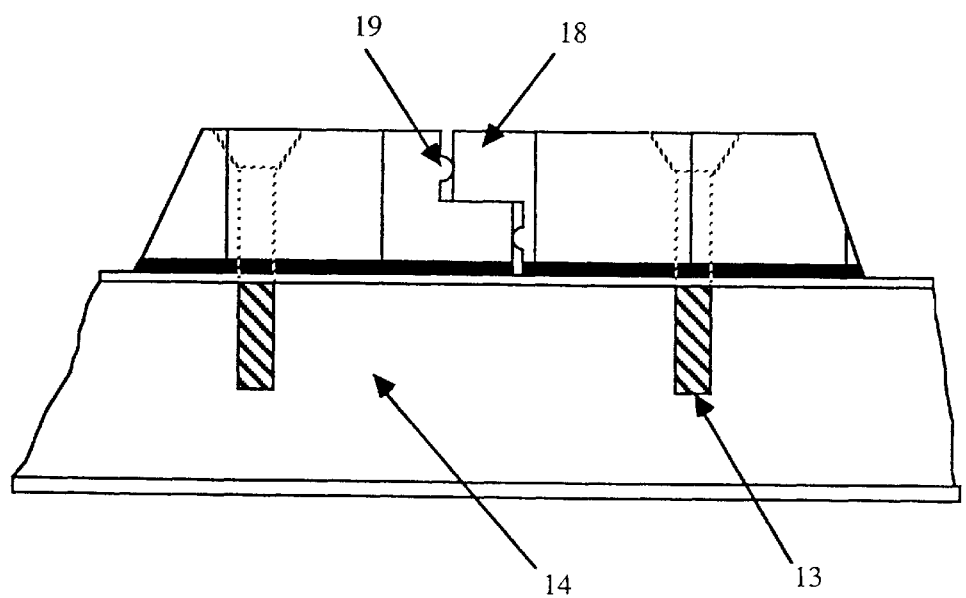
FIG. 3 is the end view of the shiplap assembly of two adjacent composite wood floor boards.
Figure 5:
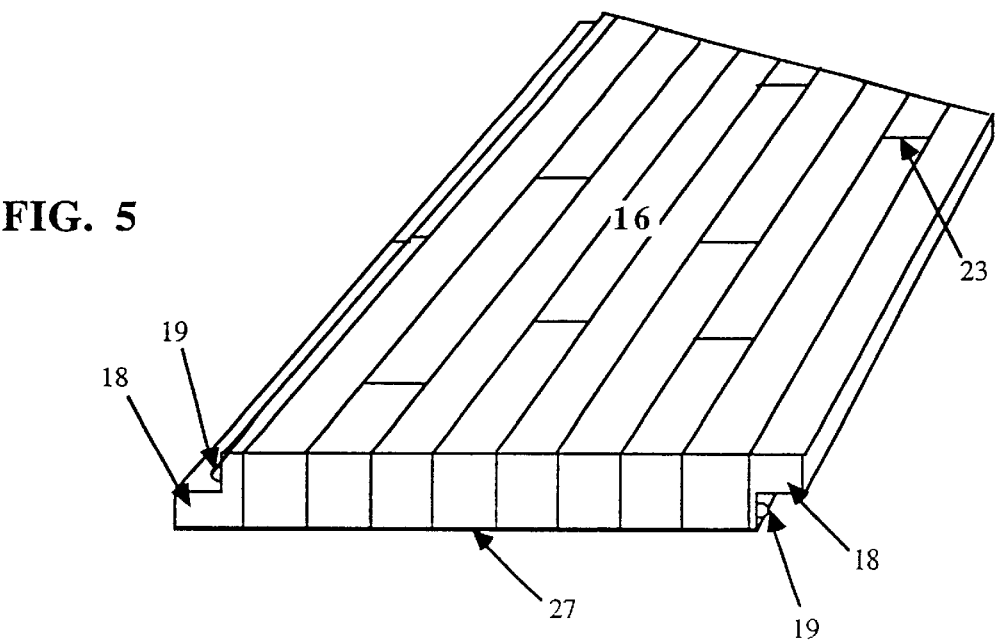
FIG. 5 is a perspective view of a conventional laminated wood floor board.

The cured laminated wood 20 is cut to a desired length (up to about 60 feet) and width (about 6 to 18 inches) to form a laminated wood board 16 (see FIG. 5). The laminated wood boards 16 are then planed to a desired thickness and shiplaps 18 and crusher beads 19 are machined on its sides. A shiplap 18 is a rectangular projecting lip running along the length on each side of a floor board. The crusher bead 19 is a small semi-circular projection running along the length on each side of a board and placed over or below a shiplap 18. When the floor boards are assembled in a trailer such that the side edges of corresponding boards are squeezed together, the shiplaps 18 of adjacent boards overlap to form a seam. The crusher beads 19 provide spacing between adjacent boards and help in preventing buckling of the boards due to expansion on wetting. A wood putty is applied at the hook joints 23 on the top and bottom surfaces of the boards to fill any resident gaps. Finally, the underside of the floor boards are coated with a polymeric substance termed as "undercoating" 27 to provide moisture protection. The finished floor boards are assembled into a kit of about eight boards for installation in trailers. Normally, a kit consists of two boards with special shiplaps so that they will fit along the road and curb sides 15 of a trailer 12. The other boards may be identical in design and they are placed between the road and curb side boards. All the boards are supported by thin-walled cross-members 14 of I, C or hat sections, each having an upper flange, which span the width of the trailer and are regularly spaced along the length of the trailer. Each floor board is secured to the cross-members by screws 13 extending through the thicknesses of the board and the flanges of the cross-members (See FIGS. 1–3).

Figure 6:
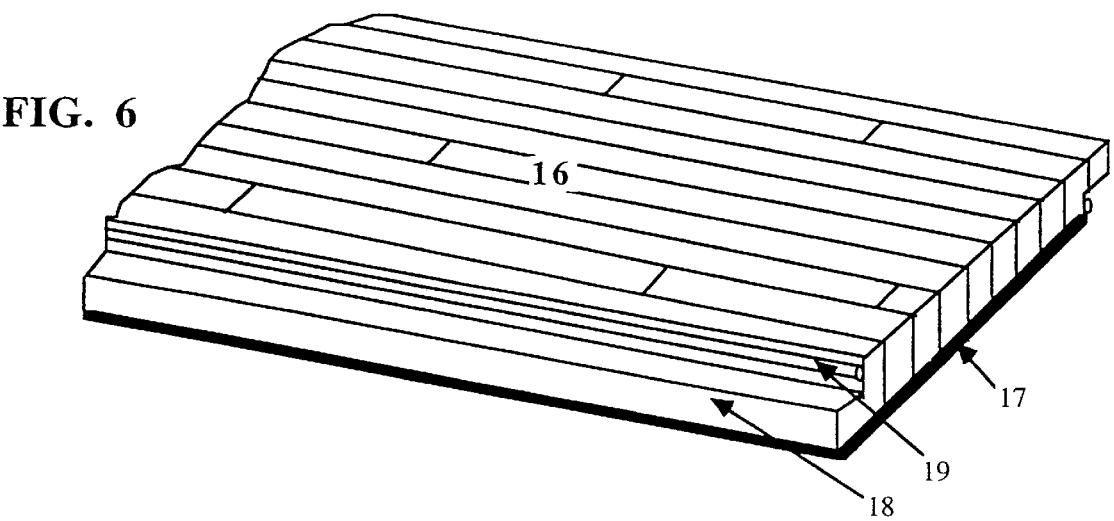
FIG. 6 is a perspective view of a reinforced composite wood floor board of a first embodiment of the invention.
Figure 7:
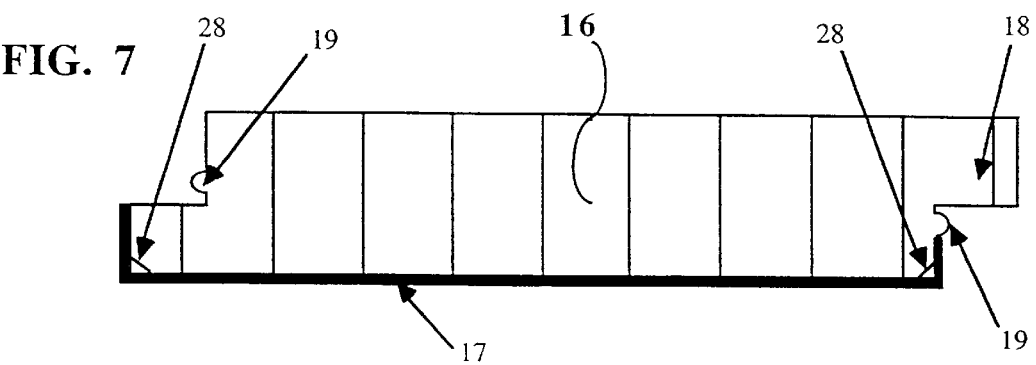
FIG. 7 is a sectional view of a reinforced composite wood floor board of a second embodiment of the invention.
Figure 8:
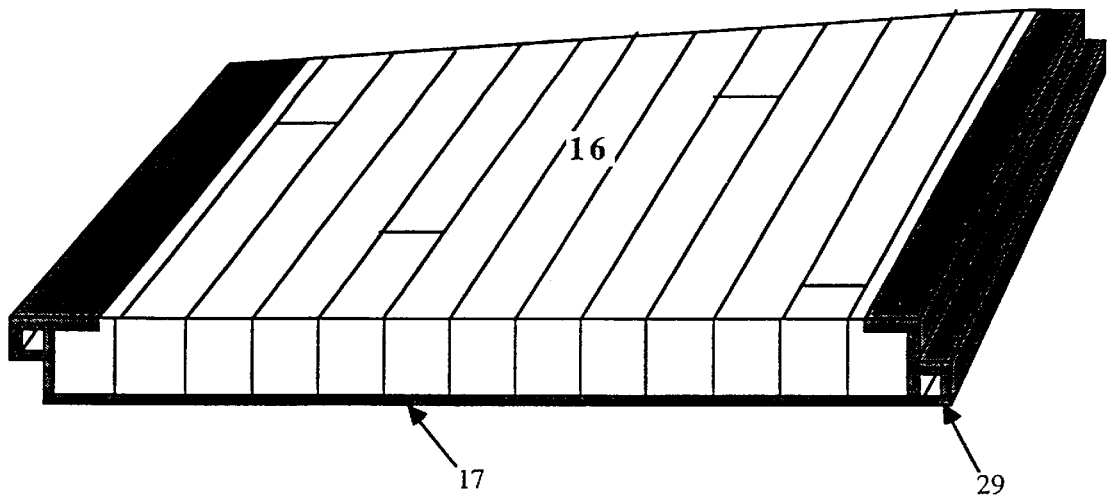
FIG. 8 is a perspective view of a reinforced composite wood floor board of a third embodiment of the invention.

The reinforced composite wood flooring of the present invention improves the above described construction of conventional wood flooring by moisture proofing the flooring and reinforcing the flooring with a laminate layer of fiber reinforced plastic (FRP) 17 (as representatively shown in FIGS. 6–8).

Three basic designs of the composite wood floor of the invention with laminated wood board 16 on top and FRP 17 on the bottom are presented below. These designs differ from one another in their physical forms so that they may be suitable for manufacture by appropriate methods. The primary functions of the FRP 17 in all the designs are essentially the same, i.e., to improve the mechanical and fatigue properties of the floor and also to provide a barrier to the seepage of moisture into the trailer through the wood flooring. In addition, the FRP 17 can have other important functions as detailed below. The first, second, and third design embodiments are shown in FIG. 6, FIG. 7, and FIG. 8, respectively.

As shown in FIG. 6, the reinforced composite wood floor board consists of a laminated wood floor board 16 with an underlayer of FRP 17. The shiplaps 18 and crusher beads 19 are machined on the sides of the reinforced composite wood floor board similarly to those in a conventional laminated wood floor board (FIG. 5).

The embodiment of FIG. 7 differs slightly from that of FIG. 6. The laminated wood floor board 16 with conventional shiplaps 18 is enclosed on the bottom side by a U-shaped FRP 17. The U-shaped FRP 17 is formed separately from the wood flooring by a conventional pultrusion process. The bottom corners 28 of the laminated wood board 16 are chamfered. The chamfered edges facilitate the attachment and adhesion of the U-shaped FRP 17 to the bottom and side surfaces of the board.

As shown in FIG. 8, a laminated wood floor board 16 is fully enclosed by an FRP on three sides including the bottom and the two vertical sides. A small portion of the top surface at the two sides of the board are also covered by the FRP. The shiplaps are formed by thin-walled box-type ribs 29 of FRP 17 which are integrally attached to the FRP underlayer. This embodiment of the FRP 17 layer provides moisture proofing across the bottom, along the opposite sides, and over portions of the board top surface.

Figure 9:
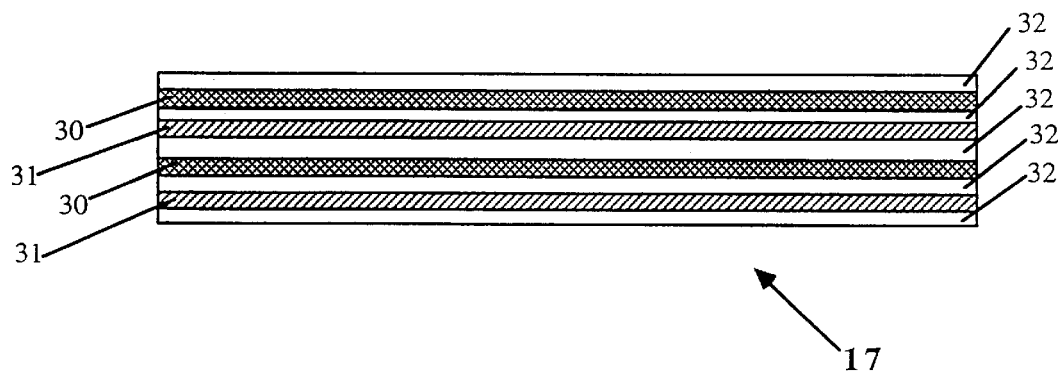
FIG. 9 is a sectional view showing a typical layup of fiber reinforcements.

Process I for Embodiment I (FIGS. 6 and 9):

Conventional laminated wood 20 is constructed according to the method set forth above. The FRP 17 layer is bonded to the sanded bottom surface of the laminated wood 20. A typical layup of the FRP 17 for Process I is shown in FIG. 9. The FRP 17 consists of continuous or chopped strand mats 30, fabrics 31, and a suitable polymeric resin 32 such as epoxy or phenolic that can provide good adhesion to wood. A plurality of fabrics 31 are alternated with a plurality of mats 30 in the layup, and a mat 30 is also used adjacent to the wood surface. A layer of resin 32 is applied between each of the alternated layers of mats 30 and fabrics 31 which soaks into these layers. Since the mat adjacent to the wood surface provides a higher resin content, it improves the delamination resistance between the FRP 17 and laminated wood 20 and also between any two adjacent layers of fabrics. Instead of the multiple layers of mats and fabrics, a single layer of fabric of the reinforcing fibers can be used to form the FRP. The fabric can also be designed to have a layer of mat stitched to it, if required. The fiber reinforcement of the FRP 17 contains about 70 to 100%, more preferably about 90 to 100%, of its continuous fibers in the longitudinal direction while the remaining fibers are aligned along the lateral direction of the floor. The longitudinal fibers impart higher mechanical properties along the length direction of the floor and offer resistance to "pop-out" of lumber strips 21 near the hook joints 23 under fatigue loading. The lateral fibers impart higher mechanical properties in the width direction of the floor and offer resistance to the longitudinal splitting of the composite and/or glue lines 22 in the laminated wood 20 while enduring lift truck loads. Alternatively, the FRP 17 is designed such that about 70 to 100%, preferably about 90 to 100%, of the strength of the reinforcing fibers alone contribute to the longitudinal strength of the FRP and floor boards.

The resin-wetted reinforcements comprising the FRP layer are stacked on the lower platen of a hotpress and the laminated wood 20 is placed on top of the stack with its sanded bottom face in contact with the reinforcement layers of the FRP. Pressure is applied by means of air bags on the top surface of the laminated wood 20 to compact the wetted reinforcement beneath the laminated wood 20. Heat is applied on the bottom side of the FRP layer by the hotpress to cure the resin and bond the reinforcements to the laminated wood 20. The reinforced composite wood board, comprising the laminated wood 20 and the FRP 17, is then ripped into several boards 16 which are then machined on the sides to form the shiplaps 18 and crusher beads 19.

Figure 4A:
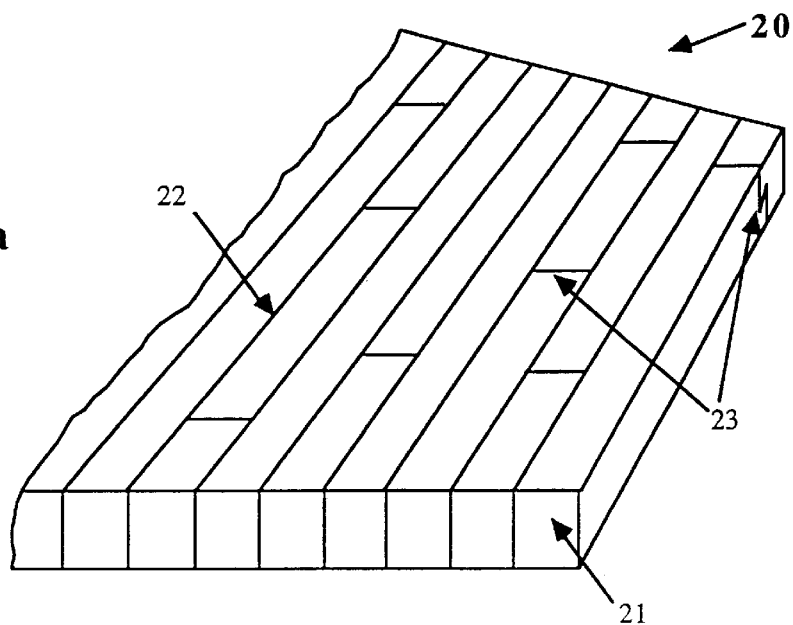
FIG. 4a is a perspective view of laminated wood with several randomly arranged hook joints.
Figure 4B:
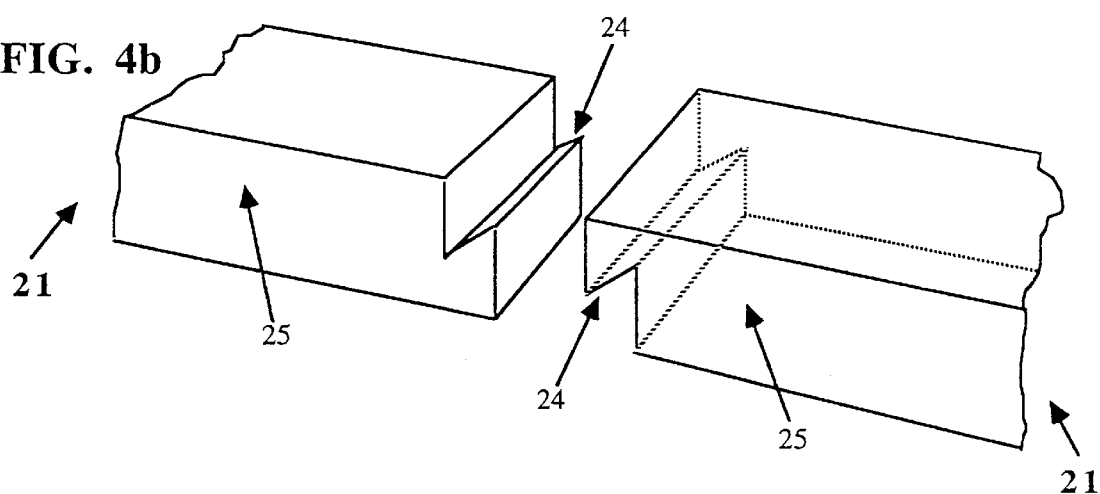
FIG. 4b is a perspective view of two opposing hooked ends of lumber strips.
Figure 4C:
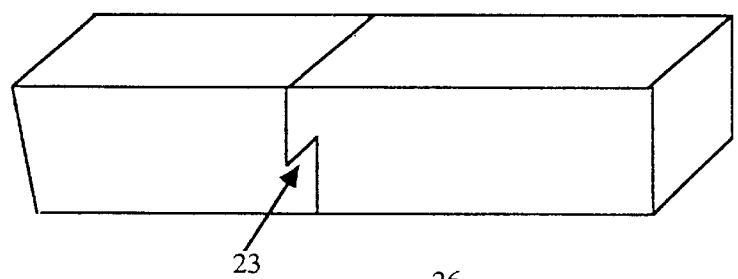
FIG. 4c is a perspective view of a perfect hook joint with little or no gap.
Figure 4D:
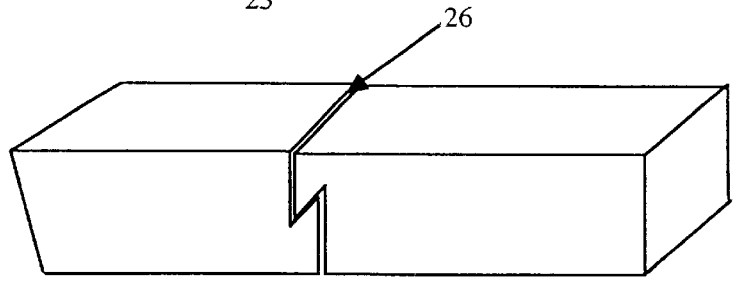
FIG. 4d is a perspective view of an imperfect hook joint with a significant gap.

Process II for Embodiment I (FIGS. 4a and 6):

Conventional laminated wood 20 constructed according to the method set forth above is sanded on the top side and also planed on the bottom side. Resin-wetted reinforcements of the FRP layer, which includes a combination of continuous rovings, fabrics and mats, are continuously laid above the sanded surface of the laminated wood 20 as it is moved over a roller conveyor. A release sheet is laid over the wet FRP layer. The laminated wood 20 is pushed into a gap between two sets of rollers, one above the other. The top rollers are hot and in direct contact with the release sheet covering the wet reinforcement FRP layer. The FRP is compacted and bonded to the laminated wood 20 due to the heat and pressure applied on it by the top rollers. The reinforced composite floor thus formed is continuously pulled out of the roller press at the end of the roller conveyor. It will be understood that the laminated wood 20, as shown in FIG. 4a, is converted to a laminated wood board 16, as shown in FIG. 6, after the FRP 17 layer is applied and after the laminated wood 20 with FRP 17 is machined conventially to form shiplaps 18 and crusher beads 19 thereon.

Process III for Embodiments I (FIG. 6) and II (FIG. 7):

A laminated wood floor board 16 with shiplaps 18 and crusher beads 19 are fabricated by the conventional process set forth above. A prefabricated FRP flat sheet is then adhesively bonded to the bottom side of the board to produce a reinforced composite floor board in accordance with Embodiment I. The laminated wood board is sanded on one side to develop a flatter surface than that provided by planing. The FRP sheet is also sanded on one side to render it flat and clean for bonding. An adhesive is coated on the sanded side of the board and/or the FRP. The edges of the FRP are aligned along the edges of the wood board. The FRP is bonded to wood board using a platen press or rollers that can apply pressure. Heat is applied on the FRP to cure the adhesive in the case of thermosetting adhesives such as epoxy, polyurethane and phenolic. For thermoplastic adhesives, the combination of the FRP and wood board is compacted using pressure rollers with cooling. The FRP is fabricated with continuous fibers in the form of continuous rovings and fabrics. Preferably, mats are not used in this case. About 70% to about 100% of the fiber reinforcement is aligned along the longitudinal direction while the remaining fibers are aligned along the lateral direction of the FRP/floor board. Alternatively, a pultruded FRP with a U-shaped cross-section is bonded to the bottom and opposite left and right sides of the board to produce a reinforced composite floor in accordance with Embodiment II. An adhesive is applied on the preformed, U-shaped FRP and the sanded bottom surface of the floor board. The bonding of the FRP to the board is done under pressure in a hotpress or by using compaction rollers. Chamfers are provided along the left and right bottom corners 28 of the floor boards to ease their assembly into the U-shaped FRP panels as shown in FIG. 7. The space between the inside corners of the U-shaped FRP and the chamfered bottom corners 28 of the wood floor board help to hold excess adhesive that may be squeezed-out during the bonding operation.

Process IV for Embodiments I (FIG. 6), II (FIG. 7), and III (FIG. 8):

A laminated wood board 16 is constructed according to the conventional method set forth above. The FRP layer is then fabricated and simultaneously bonded to the board, with or without conventional shiplaps, by laying the resin-wetted reinforcements, comprising a combination of the strand mats 30, fabrics 31, and continuous rovings on the sanded surface of the laminated wood board 16 and pulling the combination together through a heated die. This process is an adaptation of the pultrusion process which normally involves the pulling of resin-wetted reinforcements through a heated die. The FRP is formed in correspondence to the shape of the die while the resin is cured in the die.

A 20 foot long composite wood floor kit consisting of eight floor boards was fabricated according to Process I as detailed above. The laminated wood was made of red and white oak strips which were edge-glued using urea-melamine formaldehyde adhesive. About 50 oz/sq yd of E-glass reinforcements were used in the form of woven rovings and continuous strand mats to fabricate the reinforced composite wood floor boards. A resin system consisting of Bisphenol-A epoxy resin, a reactive diluent, flexibilizer and an amine curing agent was used to bind the reinforcements and bond them to the laminated wood. The finished thickness of the reinforced composite wood floor was about 1.19 inches.

In testing the reinforced composite wood floor of the invention, eight reinforced composite wood floor boards were installed in a van trailer after removing a 20 foot section of its existing wood flooring close to the central part of the trailer. The floor was supported by I-beam cross-members running along the width of the trailer and regularly spaced at 12 inches in the test section. The cross-members with a section of 4 inches by 2.25 inches were made of steel with a yield strength of 80 ksi and weighing about 3.2 lbs/foot. The floor boards were secured to each cross-member in the test section by three screws running through the thicknesses of the boards and the top flange of the cross-member. A lift truck simulator with two loading wheels and two steering wheels was stationed on the floor. The simulator was loaded with dead weights so that a force of about 16,500 lbs could be applied on the floor through the loading wheels. The force applied on the floor through the steering wheels was relatively insignificant. To subject the floor to fatigue loading, the simulator was moved back and forth on the floor such that the loading wheels could travel about 13 feet in each direction in the central portion of the composite floor. The simulator was allowed to complete 3,000 fatigue loading cycles, wherein during each cycle the simulator moved by 13 feet in one direction and returned back to its starting line. At the end of 3,000 fatigue loading cycles, the reinforced composite floor experienced little or no significant damage.

In another test, a 0.125-inch thick, two-inch wide and about 98-inch long steel shim was used between the cross-members and the reinforced composite floor. As before, the floor system was tested at 16,500 lbs. At the completion of 3,000 fatigue cycles at the load of 16,500 lbs, the simulator was reconfigured so as to apply a force of about 23,000 lbs on the floor. Once again, the simulator was moved back and forth to complete another 3,000 fatigue cycles at the high load. The reinforced composite wood floor was checked to determine the level of damage due to the repeated loading or fatigue. There was no significant breakage or fracture of the floor on its underside. The glass fibers were intact, although wood seemed to have fractured on the top side of the floor near some of the shiplaps. The motion of the simulator was unaffected at all times during the test. There were no holes or splinters on the bottom side of the floor.

A conventional oak floor with a nominal thickness of 1.38" was tested in a trailer by repeating the above-mentioned fatigue test procedure. The wood floor was laid directly over the cross-members. On the completion of 3,000 fatigue cycles at 16,500 lbs of loading, the conventional oak floor showed some damage in the form of cracking of edge glue lines and pop-out of lumber strips near some of the hook joints. Slight fracture of lumber strips was also noticed at a few locations. When the fatigue test was continued at an increased load of 23,000 lbs., the floor experienced severe damage even in the first 200 fatigue cycles. The floor was seen to fracture at several locations and produce a significant amount of cracking noise. After about 400 cycles at 23,000 lbs., the floor appeared to have little or no strength and stiffness at locations between some adjacent cross-members. At this time, the simulator wheels essentially rolled over the cross-members and dived in and out of the pits created due to the severely damaged floor sections. This caused considerable shaking and vibration in the trailer due to a bumpy path created by broken floor sections. Clearly, the conventional oak floor failed the test and therefore proved to be much inferior to the composite wood flooring.

It was clear from the above-mentioned tests that a 1.19" thick reinforced composite wood flooring weighing about 4.9 lbs/sq ft could be superior to a 1.38" thick conventional wood flooring weighing about 5.4 lbs/sq ft. The reinforced composite floor can be used in trailers to sustain nominal lift truck loads of 16,500 lbs while saving about half pound of weight per square foot of the floor. In addition, with slight modification of the design of the cross-members, the load carrying capacity of the truck floor system can be increased considerably with little or no increase in the weight of the trailer. The excellent fatigue resistance of the reinforced composite flooring is essentially due to the ability of the FRP underlayer to prevent the pop-out of the lumber strips. The hook joints are completely covered on the bottom side of the floor and therefore water cannot penetrate through their gaps into the trailer. Due to the higher strength of the reinforced composite wood floor, its thickness can be reduced below that of an equivalent conventional wood floor. This in turn can lead to a significant weight saving in a trailer and hence increase its cargo carrying capacity.

We claim:

1. A composite flooring system for van-type vehicular trailers, said flooring comprising:

a plurality of wood boards, each wood board having a length, width, and thickness and formed of a plurality of solid wood components, each component having a length and a width substantially less than the length and width of the board, respectively, said components arranged substantially parallel to the length of the board and joined to one another in a unitary arrangement, said wood board having a wood top surface and a bottom surface; and a water impervious layer continuously bonded to said bottom surface of each board by a substantially continuous adhesive bond.

2. The composite flooring system of claim 1, wherein the water impervious layer comprises a layer of fiber reinforced polymer bonded to said bottom surface.

3. The composite flooring system of claim 2, wherein about 70% to 90% of the fibers of the fiber reinforced polymer extend in a direction substantially parallel to the longitudinal length of the boards of the composite flooring system.

4. The composite flooring system of claim 2, wherein said wood is a hardwood selected from the group consisting of ash, yellow-poplar, elm, oak, maple, birch and beech, and the fibers are glass fibers, carbon fibers, or mixtures thereof.

5. The composite flooring system of claim 2, wherein said fiber reinforced polymer layer comprises rovings of continuous fibers impregnated by a polymeric resin.

6. The composite flooring system of claim 2, wherein said fiber reinforced polymer layer comprises one or more strand mat impregnated by a polymeric resin.

7. The composite flooring system of claim 2, wherein about 70 to 90% of said continuous fibers extend in a direction substantially parallel to the longitudinal length of the boards of the trailer floor.

8. The composite flooring system of claim 2, wherein the polymer of the fiber reinforced polymer is selected from polymers of the group consisting of vinyl ester, polyester, epoxy, phenolic, polypropylene, and polyamide polymers.

9. The composite flooring system of claim 2, wherein the fiber reinforced polymer comprises a combination of continuous rovings and one or more fabrics of reinforcing fibers impregnated by a polymeric resin.

10. The composite flooring system of claim 2, wherein said fiber reinforced polymer comprises one or more fabrics of reinforcing fibers which fabric is selected from the group consisting of woven rovings, stitched fabrics and knitted fabrics.

11. In a hardwood composite flooring system for van-type vehicular trailers, said flooring comprising:

a plurality of hardwood boards, each hardwood board having a length, width, and thickness and formed of a plurality of solid hardwood components, each component having a length and a width substantially less than the length and width of the board, respectively, said components arranged substantially parallel to the length of the board and joined to one another in a unitary arrangement, said hardwood board having a hardwood top surface and a bottom surface and a layer of reinforcement continuously bonded to the said bottom surface of each board by a substantially continuous adhesive bond;

the improvement thereby, in one or more of the features of strength, weight saving and water protection of the flooring.

12. The composite flooring system of claim 11, wherein said layer of reinforcement is a layer of fiber reinforced polymer.

13. The composite flooring system of claim 11, wherein about 70% to 90% of the fibers of the fiber reinforced polymer extend in a direction substantially parallel to the longitudinal length of the boards of the composite flooring system.

14. The composite hardwood flooring system of claim 12 wherein the wood is selected from the group consisting of ash, yellow-poplar, elm, oak, maple, birch and beech, and the fibers are glass fibers, carbon fibers or mixtures thereof.

15. The composite hardwood flooring system of claim 12, wherein the polymer of the fiber reinforced polymer is selected from the polymers of the group consisting of vinyl ester, polyester, epoxy, phenolic, polypropylene, and polyamide polymers.

16. The composite hardwood flooring system of claim 12, wherein the fiber reinforced polymer comprises a combination of continuous rovings and one or more fabrics of reinforcing fibers impregnated by a polymeric resin.

17. The composite hardwood flooring system of claim 12, wherein said fiber reinforced polymer layer comprises rovings of continuous fibers impregnated by a polymeric resin.

18. The composite hardwood flooring system of claim 12, wherein said fiber reinforced polymer layer comprises one or more strand mats impregnated with a polymeric resin.

19. The composite hardwood flooring system of claim 12, wherein said fiber reinforced polymer comprises one or more fabrics of reinforcing fibers which fabric is selected from the group consisting of woven rovings, stitched fabrics and knitted fabrics.

20. A composite van-type vehicular trailer flooring system formed from a plurality of wood boards, the vehicular trailer floor having a longitudinal length and a lateral width, said composite vehicular trailer flooring system comprising:

a plurality of wood boards forming a trailer floor having an upper wood surface and a bottom surface for extending for the lateral width of the vehicular trailer floor;

each of the wood boards having a plurality of wood components arranged substantially parallel to the longitudinal length of the trailer floor, said components joined to one another by an adhesive and by coupling portions; and each of the plurality of wood boards of said composite wood flooring system further comprising a planar polymer layer formed of a fiber reinforced polymer substantially continuously bonded to said bottom surface of each of the plurality of wood boards of said trailer floor, wherein about 70% to 90% of the fibers of said fiber reinforced polymer extend in a direction substantially parallel to a longitudinal length of the boards of the trailer floor.

21. In a hardwood van-type vehicular trailer flooring system having a hardwood upper surface, the vehicular trailer floor having a longitudinal length and a lateral width, and further comprising:

a plurality of hardwood boards forming a trailer floor having an upper hardwood surface and a bottom surface for extending for the lateral width of the vehicular trailer floor; and each of the hardwood boards of said composite wood flooring system having a plurality of hardwood components arranged substantially parallel to the longitudinal length of the trailer floor, said components joined to one another by an adhesive and by coupling portions; and the improvement comprising the compositing of each of the said hardwood boards with a substantially planar polymer layer formed of a fiber reinforced polymer by means of a substantially continuous bond to said bottom surface of each of the plurality of hardwood boards of said trailer floor, and about 70% to 90% of the fibers of said fiber reinforced polymer extend in a direction substantially parallel to a longitudinal length of the boards of the trailer floor.

* * * * *